(12) United States Patent
Gottesfeld (10) Patent No.: US 8,895,198 B2
(45) Date of Patent: Nov. 25, 2014

(54) SYSTEMS AND METHODS OF SECURING IMMUNITY TO AIR $CO_2$ IN ALKALINE FUEL CELLS

(75) Inventor: Shimson Gottesfeld, Niskayuna, NY (US)

(73) Assignee: Cellera, Inc. (IL)

( * ) Notice: Subject to any disclaimer, the term of this patent is extended or adjusted under 35 U.S.C. 154(b) by 953 days.

(21) Appl. No.: 12/862,746

(22) Filed: Aug. 24, 2010

(65) Prior Publication Data

US 2011/0212370 A1 Sep. 1, 2011

Related U.S. Application Data

(60) Provisional application No. 61/236,282, filed on Aug. 24, 2009.

(51) Int. Cl.
*H01M 8/06* (2006.01)
*H01M 8/08* (2006.01)

(52) U.S. Cl.
CPC .............. *H01M 8/0668* (2013.01); *Y02E 60/50* (2013.01); *H01M 8/083* (2013.01)
USPC .......................................... 429/410; 429/408

(58) Field of Classification Search
CPC ..... H01M 8/0668; H01M 8/083; Y02E 60/50
USPC ........................................................ 429/410
See application file for complete search history.

(56) References Cited

U.S. PATENT DOCUMENTS

| | | |
|---|---|---|
| 3,909,206 A | 9/1975 | Katz |
| 4,191,453 A | 3/1980 | Beni et al. |
| 4,253,922 A | 3/1981 | Welch |
| 4,910,099 A | 3/1990 | Gottesfeld |
| 5,082,550 A | 1/1992 | Rishpon et al. |

(Continued)

FOREIGN PATENT DOCUMENTS

| | | |
|---|---|---|
| WO | WO-03031028 A1 | 4/2003 |
| WO | WO-2004042857 A1 | 5/2004 |
| WO | WO-2005035100 A1 | 4/2005 |

OTHER PUBLICATIONS

Drese et al., "Synthesis-Structure-Property Relationships for Hyperbranched Aminosilica CO2 Adsorbents", Advanced Functional Materials, 19:3821-3832 (2009).

*Primary Examiner* — Gary Harris
(74) *Attorney, Agent, or Firm* — ISUS Intellectual Property PLLC (57) ABSTRACT

An air $CO_2$ filtration assembly or system is provided that includes $CO_2$ filters or traps designed and configured with a limited, but high capacity, volume to maximize filtration/absorption of $CO_2$ from an air stream supplied to an alkaline fuel cell to thereby minimize the $CO_2$ level in the air stream fed into the fuel cell cathode. The $CO_2$ filters or traps include at least one thermally regenerative $CO_2$ chemical filter or trap arranged in a tandem configuration with a strongly bonding $CO_2$ chemical filter or trap. The combination of the two types of filters or traps sequentially filter/absorb $CO_2$ from the air stream and reduce the level of $CO_2$ in the air stream fed into the cathode. The air $CO_2$ filtration assembly or system may be used in conjunction with electrochemical purging of the alkaline fuel cell that enables removal of $CO_2$ from the fuel cell by anodic decomposition of accumulated carbonate ions in the fuel cell anode and release of $CO_2$ through the anode exhaust stream.

16 Claims, 5 Drawing Sheets

(56) References Cited

U.S. PATENT DOCUMENTS

| | | | |
|---|---|---|---|
| 5,108,573 | A | 4/1992 | Rubinstein et al. |
| 5,227,042 | A | 7/1993 | Zawodzinski et al. |
| 5,366,821 | A | 11/1994 | Merritt et al. |
| 5,368,717 | A | 11/1994 | Gottesfeld et al. |
| 5,527,640 | A | 6/1996 | Rudge et al. |
| 6,140,466 | A | 10/2000 | Barbas, III et al. |
| 6,203,936 | B1 | 3/2001 | Cisar et al. |
| 6,221,523 | B1 | 4/2001 | Chun et al. |
| 6,242,568 | B1 | 6/2001 | Barbas, III et al. |
| 6,296,964 | B1 | 10/2001 | Ren et al. |
| 6,356,433 | B1 | 3/2002 | Shi et al. |
| 6,383,640 | B1 | 5/2002 | Shi et al. |
| 6,458,479 | B1 | 10/2002 | Ren et al. |
| 6,488,837 | B1 | 12/2002 | Ren et al. |
| 6,686,081 | B2 | 2/2004 | Gottesfeld |
| 6,696,382 | B1 | 2/2004 | Zelenay et al. |
| 6,821,658 | B2 | 11/2004 | Acker et al. |
| 6,824,899 | B2 | 11/2004 | Acker et al. |
| 6,841,283 | B2 | 1/2005 | Breault |
| 6,890,680 | B2 | 5/2005 | Beckmann et al. |
| 6,936,368 | B2 | 8/2005 | Hirsch et al. |
| 6,962,760 | B2 | 11/2005 | Rice et al. |
| 6,981,877 | B2 | 1/2006 | Ren et al. |
| 6,986,961 | B1 | 1/2006 | Ren et al. |
| 6,991,865 | B2 | 1/2006 | Acker et al. |
| 7,083,708 | B2 | 8/2006 | Chlistunoff et al. |
| 7,179,501 | B2 | 2/2007 | Beckmann et al. |
| 7,282,293 | B2 | 10/2007 | Ren et al. |
| 7,332,241 | B2 | 2/2008 | Jaouen |
| 7,407,721 | B2 | 8/2008 | Ren et al. |
| 7,510,794 | B2 | 3/2009 | Gottesfeld et al. |
| 7,541,109 | B2 | 6/2009 | Ren et al. |
| 7,638,215 | B2 | 12/2009 | Ren et al. |
| 2002/0034675 | A1 | 3/2002 | Starz et al. |
| 2002/0086193 | A1 | 7/2002 | Acker et al. |
| 2002/0122966 | A1 | 9/2002 | Acker et al. |
| 2003/0031907 | A1 | 2/2003 | Gottesfeld |
| 2003/0143448 | A1* | 7/2003 | Keefer ............................ 429/26 |
| 2003/0157395 | A1 | 8/2003 | Ren et al. |
| 2003/0157396 | A1 | 8/2003 | Beckmann et al. |
| 2003/0198843 | A1* | 10/2003 | Struthers ......................... 429/20 |
| 2004/0023086 | A1* | 2/2004 | Su et al. ........................... 429/17 |
| 2004/0062980 | A1 | 4/2004 | Ren et al. |
| 2004/0069144 | A1 | 4/2004 | Wegeng et al. |
| 2004/0076859 | A1 | 4/2004 | Gottesfeld |
| 2004/0166401 | A1 | 8/2004 | Srinivas |
| 2004/0191584 | A1 | 9/2004 | Rice et al. |
| 2004/0209136 | A1 | 10/2004 | Ren et al. |
| 2004/0209143 | A1 | 10/2004 | Hirsch et al. |
| 2004/0209154 | A1 | 10/2004 | Ren et al. |
| 2004/0265680 | A1 | 12/2004 | Ren et al. |
| 2005/0026005 | A1 | 2/2005 | Chlistunoff et al. |
| 2005/0053811 | A1 | 3/2005 | Acker et al. |
| 2005/0147862 | A1 | 7/2005 | Knoop et al. |
| 2005/0170224 | A1 | 8/2005 | Ren et al. |
| 2005/0181271 | A1 | 8/2005 | Ren et al. |
| 2005/0196666 | A1 | 9/2005 | Gottesfeld et al. |
| 2005/0227140 | A1 | 10/2005 | Beckmann et al. |
| 2006/0068271 | A1 | 3/2006 | Ren et al. |
| 2006/0266642 | A1 | 11/2006 | Akle et al. |
| 2006/0286429 | A1 | 12/2006 | Shiepe et al. |
| 2007/0089605 | A1 | 4/2007 | Lampinen |
| 2007/0128500 | A1 | 6/2007 | Marsacq et al. |
| 2007/0141430 | A1 | 6/2007 | Huang et al. |
| 2008/0008921 | A1 | 1/2008 | Miura |
| 2008/0032182 | A1 | 2/2008 | Ren et al. |
| 2008/0115875 | A1 | 5/2008 | Jeng et al. |
| 2008/0145721 | A1 | 6/2008 | Shapiro et al. |
| 2008/0156549 | A1 | 7/2008 | Leboe et al. |
| 2008/0166542 | A1 | 7/2008 | Sung et al. |
| 2008/0184882 | A1* | 8/2008 | White ............................. 95/117 |
| 2008/0187824 | A1 | 8/2008 | Tomantschger |
| 2008/0206616 | A1 | 8/2008 | Atanassova et al. |
| 2009/0004529 | A1 | 1/2009 | Gur et al. |
| 2009/0042092 | A1 | 2/2009 | Martinent et al. |
| 2010/0021777 | A1 | 1/2010 | Gottesfeld et al. |
| 2010/0216052 | A1 | 8/2010 | Gottesfeld et al. |

* cited by examiner

SYSTEMS AND METHODS OF SECURING IMMUNITY TO AIR CO$_2$ IN ALKALINE FUEL CELLS

RELATED APPLICATIONS

This application is related to U.S. Provisional Application Ser. No. 61/236,282, filed Aug. 24, 2009, to which priority is claimed and the entirety of which is incorporated herein by reference.

FIELD OF THE INVENTION

The inventions provide air CO$_2$ filtration/absorption assemblies and systems for use with an alkaline fuel cell to reduce levels of CO$_2$ in air streams supplied to the fuel cell cathode. The inventions also provide methods of electrochemical purging through application of a purging current to an alkaline fuel cell to achieve electrochemical CO$_2$ removal from the fuel cell. The inventions are for air filtration/absorption in alkaline fuel cells that include alkaline aqueous electrolyte or OH$^-$ ion-conducting polymeric membranes without liquid electrolyte.

BACKGROUND

Alkaline membrane fuel cells (AMFCs) have important advantages over other low temperature fuel cells, including the ability to operate with non-precious metal catalysts and without added liquid electrolyte. However, an important challenge to the implementation of this fuel cell technology is the performance loss incurred when CO$_2$ enters the cell. When the AMFC operates on hydrogen fuel, the CO$_2$ in the cathode air feed is a specific source of concern, as the air feed contains around 400 ppm CO$_2$. This "air CO$_2$" will enter the cell continuously through the cell cathode, as long as such untreated air supplies the cathode. Under such conditions of continuous inflow of CO$_2$ at a partial pressure of about $10^{-4}$ P$_{air}$ into the cell cathode, and from the cathode into the cell, significant AMFC voltage losses have been recorded. The cell voltage at constant current density of about 0.2 A/cm$^2$-0.4 A/cm$^2$ is found to be lower by 0.1V-0.3V (in contrast to the same cell operating with a CO$_2$-free cathode air feed), and has been shown to amount to a lowering of the energy conversion efficiency by 20%-60%.

One reason for this fall in AMFC performance is understood to be an acid-base process. CO$_2$ entering the cell recombines with the basic function of the polymer electrolyte to replace the OH$^-$ ion-conducting function with a HCO$_3^-$ (bicarbonate) ion conducting function according to:

R$_4$N$^+$ is a tetra-alkyl ammonium ion, the typical immobilized cationic group in an alkaline ionomer. After entering the cell cathode in gaseous form, CO$_2$ can migrate through the thickness dimension of the cell in water-dissolved form, and can propagate the "carbonation process" shown by equation (1) throughout the membrane and the anode of the cell.

Another mode of propagation of the carbonation process through the thickness dimension of the cell is an anion-replacement process. In this case, a bicarbonate anion migrates through the ionomer under current, displacing an OH$^-$ anion according to:

This occurs while OH$^-$ ions in the AMFC migrate towards the cell anode and the anode process consumes OH- ions according to:

$$H_2 + 2OH^- = 2H_2O + 2e \quad (3)$$

where the HCO3$^-$ anion is not reactive at the anode under ordinary AMFC operation conditions.

Consequently, the ion-replacement process (2), occurring while the anode consumers OH$^-$ ions, will end up in lasting carbonation of a large fraction of the anionic sites.

Replacement of the OH$^-$ anion by HCO3$^-$ may cause significant AMFC losses for two reasons. First, the mobility of the bicarbonate ion is about 4 times smaller than that of the OH$^-$ ion, causing a drop of conductivity in both the cell membrane and the inner-electrode ionomer components. A second reason is the carbonation of OH$^-$ ions within the anode. With the OH$^-$ ion serving as a reactant in the anode process, lowering its availability for the anode process, as shown in equation (3), results in a significant increase of the anode over-potential.

Electrolyte carbonation is well documented as a significant challenge in alkaline fuel cells (AFCs) based on liquid alkaline electrolytes, e.g., aqueous KOH. The nature of the problem and the solutions required, however, are different in AFCs and in AMFCs. In the case of the AFC, the ultimate result of electrolyte carbonation is the formation of solid carbonate in the liquid electrolyte that needs to be removed continuously. This is typically accomplished with continuous electrolyte recirculation and solid/liquid separation. In the AMFC, no solid carbonate can be formed, which eliminates the need for liquid recirculation and solid carbonate removal. However, the reaction of air CO$_2$ with the liquid alkaline electrolyte to form solid carbonate provides a CO$_2$ sequestration function within the cell. Because the AMFC does not have such in-the-cell CO$_2$ sequestration function, the ionomer material in the AMFC becomes highly vulnerable to air CO$_2$ and the carbonation processes shown in equations (1) and (2) readily convert the ionomer on entry of untreated air from an OH$^-$ ion form to a carbonate ion form. Therefore, blocking entry of CO$_2$ and use of remediation tools with an alkaline fuel cell that suffers some degree of carbonation must consequently be effective in securing the cell's immunity to air CO$_2$.

Other than electrolyte recirculation, the traditional approach to minimize the effects of CO2 in alkaline fuel cells has been the upstream use of air scrubbers containing aqueous alkaline solutions or solid CO$_2$ absorbers consisting of granules of alkali and/or alkaline earth hydroxides, such as disclosed in U.S. Pat. No. 3,909,206. When passing through such scrubber or absorber filters, the CO$_2$ component in the air feed stream reacts with the OH$^-$ ions in such CO$_2$ trap to form carbonates and thereby to reduce the concentration of CO$_2$ in the air entering the cell. This mode of CO$_2$ filtration occurs upstream from the cell cathode and requires periodic replacement of the filter or of the active material in the filter. The frequency of such manual replacements cannot be too great in most fuel cell applications because of the need to minimize fuel cell maintenance. One possible way to lower the frequency of filter replacements is to use filters having a larger volume, i.e., larger CO$_2$ absorption capacity. However, the permissible size of the filter will be limited by the overall system volume constraints.

Thus, an effective CO$_2$ filter or trap having a combination of a limited, but high capacity, volume and a capacity to maximize a reduction of CO$_2$ levels in an air stream by passing the air stream through such a filter or trap is desirable to minimize CO$_2$ levels in the air stream and within an alkaline fuel cell.

SUMMARY

Applicants have identified that the demands of maximizing reduction of the CO$_2$ level in an air stream supply to an alkaline fuel cell are significantly more severe in alkaline membrane fuel cells (AMFCs) than in alkaline fuel cells (AFCs). In an AFC, entry of scrubbed air having the $CO_2$ level remaining as high as 50 ppm may not cause strong fuel cell voltage losses, particularly when the liquid electrolyte in the AFC is recirculated. However, in the case of the AMFC, the $CO_2$ level must drop well below 10 ppm to ensure near zero voltage loss. A single absorber, filter, trap, or other $CO_2$ filtration/absorption unit cannot achieve at its outlet such a low CO2 level in the air stream and have reasonable dimensions, when the air supply to the fuel cell is ordinary air having about 400 ppm $CO_2$. One reason is that the principles of filter design directed to limiting filter dimensions and achieving a high gas flow rate are contrary to those principles that aim at perfect $CO_2$ sequestration.

The inventions disclosed herein are directed to reducing the $CO_2$ level in the air stream entering the cathode of an alkaline fuel cell to help to secure a targeted efficiency level of the fuel cell and to achieve immunity to $CO_2$ and its effects within the fuel cell. The inventions may be used with an alkaline fuel cell including an alkaline aqueous electrolyte ("AFC") or an $OH^-$ ion-conducting polymeric membrane without liquid electrolyte ("AMFC"). One object of the inventions includes providing filter assemblies and methods designed and configured to simultaneously minimize the volume size of the $CO_2$ filter(s) or trap(s) and to achieve a high throughput of the $CO_2$ filter(s) or trap(s), while enabling the filter(s) or trap(s) to reduce the level of $CO_2$ level in an air stream supply to the fuel cell by a predetermined amount, e.g., by a factor of 10 or from about 400 ppm of $CO_2$ in ordinary (non-filtered) air to well under about 10 ppm $CO_2$. In addition, such methods may be used to help to achieve an "electrochemical purge" via the application of a high current perturbation across the fuel cell, e.g., for a predetermined time, to purge through the anode exhaust stream any $CO_2$ penetrating the fuel cell.

In one aspect, the invention provides a two-filter $CO_2$ filtration assembly including a combination of two types of $CO_2$ filters or traps that are operatively coupled with the fuel cell and are arranged in a tandem configuration relative to one another. The two-filter assembly is upstream from the cathode of the fuel cell to reduce the level of $CO_2$ in the air stream supplied to the cathode. More specifically, the filters or traps are designed and configured to capture or absorb $CO_2$ in the air stream, as the air stream passes through the filters or traps, to reduce the $CO_2$ level in the air stream before it enters into the cathode. The two-filter assembly thereby helps the alkaline fuel cell achieve immunity to air $CO_2$ and, therefore, its targeted efficiency levels, through the assembly's absorption of $CO_2$ in the air stream supply to the cathode.

The two types of filters or traps of the two-filter assembly according to the invention may include a first thermally regenerative chemical $CO_2$ filter or trap arranged in tandem with a second strongly bonding $CO_2$ chemical filter or trap. The first thermally regenerative filter or trap is designed and configured for thermal regeneration upon $CO_2$ saturation without requiring disassembly of the filter or trap, as described below. As mentioned, the two types of filters are disposed upstream from an inlet to the cathode, and the second strongly bonding $CO_2$ filter or trap is disposed between the first filter and the cathode inlet. The arrangement of the two-filter assembly with an alkaline fuel cell enables the first filter to receive the inlet air stream to be supplied to the cathode and to reduce the level of $CO_2$ in the air stream as the air stream passes through the first filter. The arrangement also enables the second filter, disposed in tandem with and downstream from the first filter, to receive the filtered air stream exiting from the first filter to further reduce the level of $CO_2$ in the air stream as the air stream passes through second filter before the air stream is ultimately supplied to the cathode inlet. An air pump is included between the first and the second filters to induce flow of an air stream through the two filters or traps and into the cathode inlet.

The first thermally regenerative filter is designed and configured to reduce the level of $CO_2$ in the inlet air stream by a predetermined amount, e.g., by a factor of 10. The second strongly bonding filter is designed and configured to reduce the level of $CO_2$ in the air stream filtered by and exiting from the first filter by a second predetermined amount, e.g., by a factor of 10. The air stream supplied to the cathode inlet is thereby sequentially filtered by the first and second filters, such that, the level of $CO_2$ in the air stream is supplied to the cathode inlet is significantly reduced, e.g., by a factor of 100, in one configuration of the two-filter assembly.

For instance, in one configuration of the two-filter assembly according to the invention, the first thermally regenerative filter may be configured and designed to reduce the level of $CO_2$ in ordinary air by a factor of 10, or from about 400 ppm to about 40 ppm, and the second strongly bonding filter may be configured and designed to further reduce the level of $CO_2$ in the air stream filtered by the first filter by a factor of 10, or from about 40 ppm to under 5 ppm, and preferably equal to or near 1 ppm. The two-filter assembly according to the invention may significantly reduce the level of $CO_2$ in the air stream supplied to the cathode inlet where ordinary air is used as the air supply to the fuel cell.

In another aspect, the invention provides a method of purging an alkaline fuel cell electrochemically for $CO_2$ removal from the fuel cell anode through anodic decomposition. The method includes applying a current to the alkaline fuel cell suitable to help to force participation of the accumulating carbonate ions in the anode as a reactant in the anode process, thereby freeing $CO_2$ for removal from the anode through the anode exhaust stream. The magnitude of the current is sufficiently high and just short of any magnitude that would cause an onset of fuel cell reversal in the stack. The method of electrochemical purging may be applied temporarily and periodically to the fuel cell. In addition, the method of electrochemical purging may be applied to an alkaline fuel cell in response to a decrease in the fuel cell's performance over a given period of time, such as an operation time. According to the method of the invention, the application of the electrochemical purging current may be for a predetermined duration, e.g., about 1 second to about 30 seconds. The $OH^-$ ions are replaced by carbamate ions as reactants in the anode process and are thereby consumed electrochemically. The anode process releases $CO_2$ as a by-product and the anode exhaust stream releases CO2 from the fuel cell. The method according to the invention may be used advantageously with the two-filter assembly described above, or with the $CO_2$ filtration system, described below.

In a further aspect, the invention provides a $CO_2$ filtration system for use with an alkaline fuel cell including the combination of the two types of $CO_2$ filters or traps, as described above, and further including a second thermally regenerative $CO_2$ chemical filter or trap, similar to the first thermally regenerative $CO_2$ chemical filter or trap. The first and second thermally regenerative filters or traps are arranged in parallel and disposed upstream from the inlet to the cathode. In addition, each of the first and the second thermally regenerative filters or traps is arranged in a tandem configuration relative to the strongly bonding $CO_2$ chemical filter or trap. The first and second thermally regenerative $CO_2$ filters or traps may be thermally rejuvenated without their disassembly, as described above. The first or the second thermally regenerative $CO_2$ filter, along with the strongly bonding filter, filter the air stream as the air stream passes through either thermally regenerative filter and the strongly bonding filter, as described above, to provide the air stream with a significantly reduced level of $CO_2$ to the cathode inlet. Each thermally regenerative filter is arranged in tandem with the strongly bonding $CO_2$ filter, and each of thermally regenerative filter may be engaged in active $CO_2$ absorption, while the other thermally regenerative filter undergoes thermal rejuvenation. In this manner, one of the thermally regenerative filters may always be in service to filter the incoming air stream while the other thermally regenerative filter is being regenerated.

Thermal rejuvenation of the thermally regenerative filters is accomplished by passing a warm or hot air stream through the thermally regenerative filters to help to release absorbed $CO_2$ that builds up in the filters during active operation. Thermal rejuvenation of the thermally regenerative filters can occur in-line, e.g., during operation of the fuel cell, whereby a warm or hot air stream passes through the filter undergoing regeneration. Such warm or hot air stream may include the cathode exhaust stream from the fuel cell that is redirected to either of the first or second filter undergoing thermal rejuvenation. The $CO_2$ filtration system includes a subsystem of airflow lines and valves that help to enable redirection of the cathode exhaust stream to either the first or the second thermally regenerative filter, depending on which of the first and second filters is designated for and/or undergoing thermal regeneration. The subsystem of airflow lines and valves also helps to facilitate airflow of the inlet air stream to either the first or the second thermally regenerative filter, depending on which of the first and second filters is actively filtering, as well as to direct air flow downstream from the filters to the strongly bonding $CO_2$ filter, and subsequently to the cathode inlet.

In some applications, with given filter properties and electrochemical purge conditions, complete filtration can be achieved by eliminating either the thermally regenerated filter or the strongly binding filter from the two-filter assembly or the $CO_2$ filtration system described above. The overall set of tools for elimination of CO2 effects would then include a combination of the thermally regenerative filter and the electrochemical purge, or the strongly bonding filter and the electrochemical purge.

DETAILED DESCRIPTION

The inventions provide assemblies and methods to effectively achieve substantial alkaline fuel cell immunity to air $CO_2$ based on various combinations of features provided by: (a) chemical $CO_2$ filtration through at least one high capacity/high throughput chemical $CO_2$ filter or trap that can be regenerated thermally without disassembly of the filter or trap; (b) chemical $CO_2$ filtration through at least one disposable, strongly bonding $CO_2$ filter or trap; and/or (c) electrochemical perturbation that helps to achieve anodic de-carbonation and release of $CO_2$ through the anode exhaust stream of the fuel cell.

Figure 1:
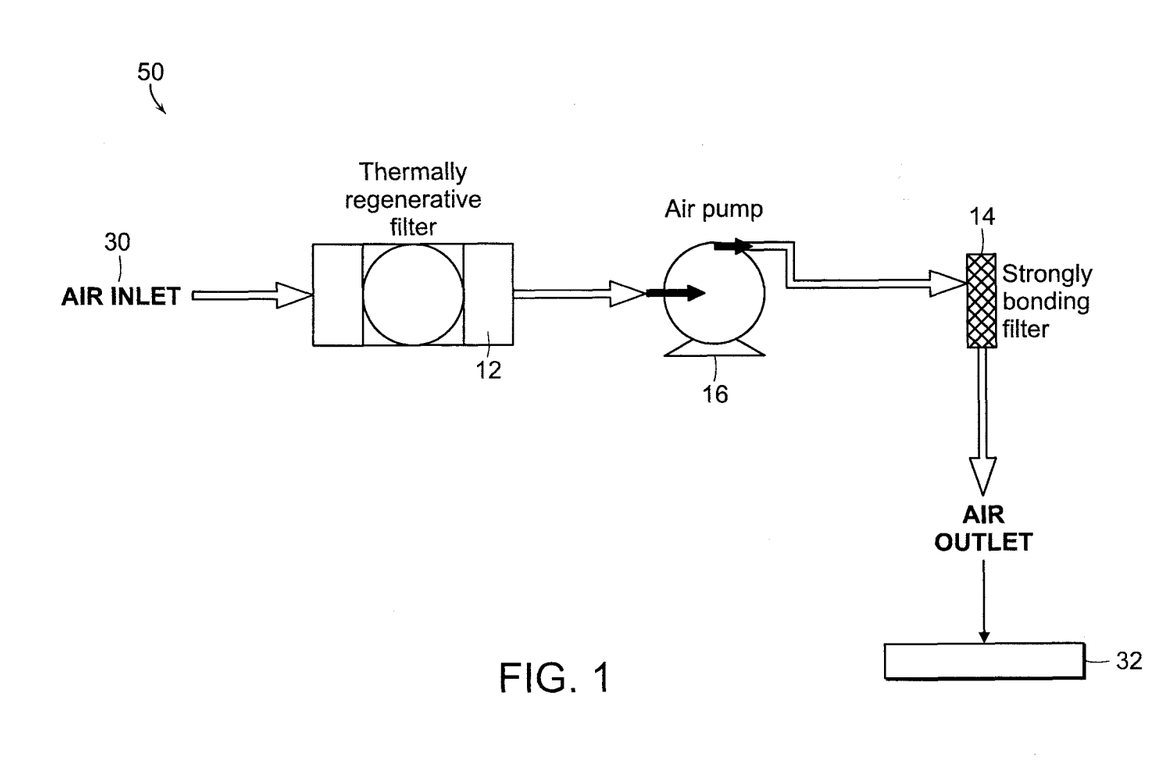
FIG. 1 is a schematic diagram of an air $CO_2$ filtration assembly for an alkaline fuel cell comprising two different types of $CO_2$ filters or traps disposed in a tandem arrangement according to one aspect of the invention.

Referring to FIG. 1, in one aspect, the invention provides a $CO_2$ filtration assembly 50 for an alkaline fuel cell including a combination of two types of filters or traps 12 and 14 arranged in a series or in a tandem configuration relative to one another. The tandem configuration of two filters 12 and 14 is positioned downstream from an inlet 30 for an ordinary air supply to the assembly 50 and upstream from an inlet 32 to the cathode of the fuel cell. The second or latter filter or trap 14 of the two filters is positioned between the first filter or trap 12 and the cathode inlet 32. An air pump 16 is disposed between the two filters 12 and 14 to induce flow of an air stream through the two filters 12 and 14 and into the cathode inlet. The two-filter assembly 50 shown in FIG. 1 may be incorporated with an alkaline fuel cell that employs an alkaline aqueous electrolyte or an $OH^-$ ion conducting polymeric membrane without liquid electrolyte.

The terms "alkaline fuel cell," "fuel cell," "cell," used to disclose the inventions below refer to an alkaline fuel cell including an alkaline aqueous electrolyte (AFC) or an $OH^-$ ion-conducting polymeric membrane without liquid electrolyte (AMFC). The inventions are not limited to either type of alkaline fuel cell and may be used with AMFCs and AFCs.

The first air filter or trap 12 of the two-filter combination is a chemical $CO_2$ filter having a high $CO_2$ absorption capacity and high air throughput that is designed and configured for thermal rejuvenation without requiring disassembly of the filter 12. The filter 12 is designed and configured to lower the $CO_2$ level in an air stream by a predetermined amount, e.g., a reduction by a factor of 10 or from about 400 ppm to about 40 ppm in ordinary air, as the air stream passes through the filter 12. The first filter 12 is also designed and configured to provide a combination of a high capacity of $CO_2$ absorption, e.g., about 5% to 8% by weight, that may be achieved under high throughput conditions, e.g., corresponding to air residence times in the filter 12 of at most about one second. These combined features of absorption capacity and dynamic throughput help to lower the level of $CO_2$ in the air stream that is ultimately provided to a cathode inlet of an alkaline fuel cell.

For instance, the first filter or trap 12 may have about 2 kg of active material per kW of power generated by the fuel cell and specifications that enable a high $CO_2$ absorption capacity and a high throughput, whereby the filter 12 in a 1 kW cell stack helps to lower the level of $CO_2$ in the air stream from about 400 ppm to about 40 ppm or by a factor of 10 during operation of the fuel cell, where the air stream passing through the filter 12 has temperatures of up to about 45 degrees C. The filter or trap 12 having such specifications may operate for up to about 8 hours after which it may become saturated with $CO_2$ and can be subsequently thermally rejuvenated.

The first filter or trap 12 is constructed of one or more active materials that enable thermal rejuvenation by removing and releasing the absorbed $CO_2$. Such rejuvenation of the first filter 12 is achieved without disassembly of the filter 12, and preferably in-line, by passing a stream of warm or hot air, e.g., via a thermal swing absorption (TSA) technique, through the filter or trap 12 to release the absorbed $CO_2$.

Thus, the first filter or trap 12 may be designed and constructed to meet the demands of thermal conditions for $CO_2$ uptake and release whereby the filter 12 provides a strong reduction in the level of $CO_2$ in the incoming air stream at operation temperatures of the alkaline fuel cell while, at the same time, enables the $CO_2$-saturated filter 12 to release absorbed $CO_2$ at temperatures sufficiently low to avoid excessive heating energy. Alkaline earth hydroxide materials have been employed for air $CO_2$ reduction, but typically require excessively high temperatures for thermal release of captured $CO_2$. In addition, the bulk of some active materials, such as oxide/hydroxide granules, are susceptible to dimensional changes that occur on carbonation and cannot undergo multiple TSA cycles without losses of absorption capacity.

Applicants have identified alternative active materials for construction of the first thermally regenerative filter or trap 12 including a family of $CO_2$ sequestration materials based on polymers with amine functional groups[1] that exhibit superior performance for the specific $CO_2$ absorption and reduction applications disclosed herein and that are required in achieving $CO_2$ immunity in alkaline fuel cells. For example, in one configuration of the two-filter assembly 50 according to the invention, the first filter or trap 12 is constructed of an active material, such as a polymer resin with amine functional groups supported on a porous ceramic substrate, which can provide the required, combined properties of $CO_2$ uptake and desorption at near room temperatures. The active material of an amine-functionalized resin and porous ceramic substrate have demonstrated $CO_2$ uptake of about 5% to 8% by weight at near room temperatures and full $CO_2$ desorption on exposure to air at temperatures not significantly higher than about 100 degrees C., with a minimum loss of fuel cell performance over multiple TSA cycles. These effects were achieved while also achieving a drop by a required or desired amount, e.g., a factor of 10, in the $CO_2$ level in the air stream after passing through the filter 12, e.g., at residence times of less than or not more than one second. Selection of the one or more specific types of active materials[2] of the first air filter or trap 12, therefore, is an important aspect of the solution of achieving $CO_2$ immunity in alkaline fuels cells according to the invention.

[1]Drese, J. H., et al., *Advanced Functional Materials*, 2008, Vol. 19, pp. 3821-3832.
[2]Id.

In addition, as described below in detail with reference to FIG. 4, the thermal regenerative filter or trap 12 may be rejuvenated with the passage of warm or hot air through the filter 12 to release $CO_2$ from the $CO_2$-saturated filter 12. The reductions in the level of $CO_2$ in the air stream that the regenerative filter 12 accomplishes at the predetermined amount, e.g., reduction by a factor of 10 or from about 400 ppm to about 40 ppm, have been shown to be maintained after multiple cycles of thermal rejuvenation of the filter 12.

Such active material(s) suitable for achieving the required combination of properties of the first air filter or trap 12 include, but not limited to, polymers with amine functional groups and polymers with amine functional groups supported on porous ceramic materials.

The second air filter or trap 14 is a disposable, strongly bonding $CO_2$ chemical filter. For example, in one configuration of the two-filter assembly 50 according to the invention, the second filter or trap 14 includes as an active material granules of inorganic hydroxide or hydroxide mixtures that help to effectively lower the $CO_2$ level by a required or desired amount, e.g., a reduction by a factor of 10 or from about 40 ppm to near 1 ppm, in the exit air stream the strongly bonding $CO_2$ filter 14 receives from the first filter 12. For instance, when such filter 14 is presented with an air stream having a $CO_2$ level at about 10% of ordinary air content, the filter 15 may help to reduce the $CO_2$ level in the air stream down to near 1 ppm. Suitable active filter material(s) of the second filter or trap 14 include materials that are strong binders of $CO_2$, which is a property that is required to achieve such low $CO_2$ exit levels. Such active filtration material(s) of the second filter 14 include, but are not limited to, soda lime, lithium hydroxide, potassium hydroxide, and sodium hydroxide.

The strongly bonding filter or trap 14 is not capable of rejuvenation at reasonable temperatures and, therefore, requires replacement when the active material is $CO_2$ saturated. However, the frequency of replacement of the second filter 14 is relatively low due to the design of the two-filter assembly 50 according to the invention, whereby the second filter 14 is relatively limited to handling an incoming air stream with only about 10% of the $CO_2$ level of ordinary air.

Thus, when the filtration assembly 50 according to the invention as shown in FIG. 1 is incorporated with an alkaline fuel cell, the assembly 50 helps to achieve $CO_2$ immunity within the cell through a series of $CO_2$ filtrations/absorptions that help to significantly reduce the $CO_2$ level in the air stream, e.g., from 400 ppm to near 1 ppm where ordinary air is used as the air supply, prior to delivery of the air stream to the cathode inlet. Such significant reduction of the $CO_2$ level in the air stream supply to the cathode inlet is achieved with minimum maintenance of the two-filter assembly 50 and minimum energy loss from the fuel cell.

In one configuration of the two-filter assembly 50 according to the invention, the first $CO_2$ filter or trap 12 is constructed of an active material(s) including, but not limited to, polymer(s) with amine functional groups configured to serve as $CO_2$ trapping sites. The reaction of the amine(s) with $CO_2$ and water vapor form bicarbonate according to the process:

$$R-NH_2 + CO_2 + H_2O = R-NH_3^+(HCO_3^-) \quad (4)$$

where R may include a carbonaceous polymer backbone.

Further, in another configuration of the two-filter assembly 50 according to the invention, the first $CO_2$ filter or trap 12 is constructed for use in dry air conditions and includes an active material(s) including, but not limited to, polymer(s) with amine functional groups configured to serve as $CO_2$ trapping sites. The reaction of the amines with $CO_2$ under dry air conditions form carbamate according to the process:

$$2(R-NH_2) + CO_2 = (R-NHCOO^-)(R-NH_3^+) \quad (5)$$

wherein R may include a carbonaceous polymer backbone.

In addition to the two-filter assembly 50 shown in FIG. 1, cell load perturbations may be applied to an operating alkaline fuel cell to help to achieve electrochemical decomposition of any carbonate that may buildup in the anode portion of the cell and to help to exhaust the $CO_2$ that forms as a result of electrochemical decomposition through the anode exhaust stream. Such an electrochemical $CO_2$ purging method according to the invention employs a fuel cell load perturbation of limited duration that passes a maximum current through the fuel cell stack for a relatively short time to help to effectively remove residual carbonate from the cell, while minimizing the duration of loss of fuel cell power supply to the load that may be incurred when high cell currents pass through the fuel cell. The phenomenon of electrochemical purge of $CO_2$ in alkaline membrane fuel cells has been described and serves as a process or technique for restoration of $CO_2$-free performance in such fuel cells. Applicants have identified that electrochemical purging alone cannot be relied upon to achieve $CO_2$ immunity in an alkaline fuel cell because the frequency and the duration of the required high-current perturbations are prohibitive in terms of the auxiliary power unit that is required to back up the fuel cell and the net time remaining for cell power supply to the load.

Applicants, however, have identified that use of an electrochemical purge approach provides real value in achieving $CO_2$ immunity in alkaline fuel cells when electrochemical purging is employed in conjunction with $CO_2$ filtration or absorption, as described above, to reduce the $CO_2$ levels, e.g., from about 400 ppm to about 20 ppm or less, in the air stream entering the cathode portion of the fuel cell. Such filtration or absorption, as mentioned, is accomplished upstream from an inlet to the cathode using the two $CO_2$ filter assembly 50 according to the invention, or using the $CO_2$ system 100 according to the invention as described in detail below. Under lower entry levels of air $CO_2$, accumulation of carbonates within the anode portion of the fuel cell takes relatively long and, consequently, current perturbations of the fuel cell are required relatively infrequently. When the two-filter assembly 50 including the thermally regenerative filter 12 and the strongly-bonding $CO_2$ filter 14 are used upstream to the cathode inlet, the electrochemical purge method functions as a "polishing" tool that helps to correct a slow buildup of carbonates in the anode that may result from, for instance, any imperfection in the functions of either filter 12 and 14.

The electrochemical purging method according to the invention enables electrochemical removal of $CO_2$ from an alkaline fuel cell when the ordinary anode process cannot support a demand current due to the replacement of a large fraction of $OH^-$ ions in the anode by carbonate ions. Under such conditions, the carbonate ion can replace the $OH^-$ ion as a reactant in the anode process according to:

$$\tfrac{1}{2}H_2+HCO_3^-=H_2O+CO_2+e, \quad (6)$$

thereby "freeing" $CO_2$ to leave the fuel cell through the anode exhaust stream. The process shown by equation (6) is followed by instantaneous filling of the anionic sites emptied by the electrochemical decomposition of carbonate ions with $OH^-$ ions migrating into and through the anode. The process of anodic carbonate decomposition, therefore, occurs while the anionic current through the thickness dimension of the cell is maintained according to:

$$(R_4N^+HCO_3^-)+\tfrac{1}{2}H_2+OH^-=(R_4N^+OH^-)+CO_2+H_2O+e. \quad (7)$$

The key for removal of carbonate from an alkaline fuel cell by such anodic de-composition, therefore, is temporary electrochemical perturbation by an application of the maximum current possible to help to force participation of the carbonate in the anode process. At the same time, such a temporary load modification, which helps to ensure the desired process shown in equation (6), involves stack operation at practically zero power output levels. Consequently, additional power can be provided for the duration of the perturbation process and can be provided from an auxiliary power source, e.g., an ultra-capacitor, or a battery. In addition, to help to ensure overall high conversion efficiency, the fraction of operation time used for repetitive electrochemical rejuvenation of the fuel stack would not be larger than several percentage points, e.g., from about 1% to about 10%.

Figure 2:
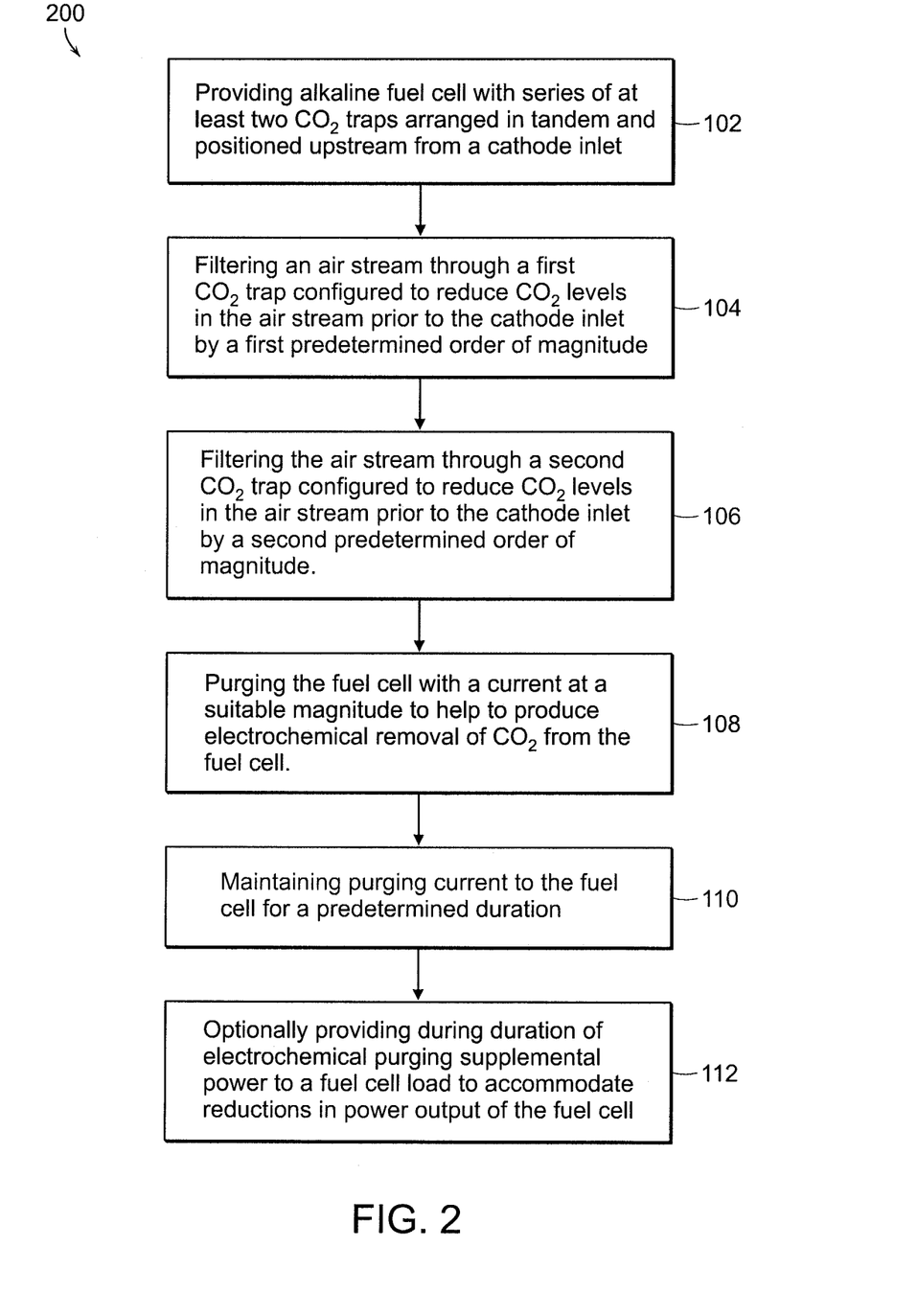
FIG. 2 is a flow diagram illustrating a method of achieving $CO_2$ immunity in an alkaline fuel cell including $CO_2$ filtration of an air stream to a cathode inlet and electrochemical perturbation of the fuel cell for anodic de-carbonation and release of $CO_2$ from the fuel cell through an anode exhaust stream.

Therefore, referring to FIG. 2, another aspect of the invention provides a method 200 of achieving $CO_2$ immunity in an alkaline fuel cell including $CO_2$ filtration of an air stream to a cathode inlet 32 of the fuel cell employing the two-filter assembly 50 according to the invention, or the $CO_2$ filtration system 100 according to the invention described below, and electrochemical perturbation of the fuel cell for anodic de-carbonation and $CO_2$ release. The method 200 shown in FIG. 2 is exemplary only and the method 200 may be modified, e.g., by adding, removing, and/or rearranging the stages disclosed below.

At stage 102, the method includes providing an alkaline fuel cell with a series of $CO_2$ filters or traps 12, 12A or 12B and 14 that is positioned upstream from a cathode inlet of the fuel cell with at least a first thermally regenerative chemical $CO_2$ filter or trap 12, 12A or 12B arranged in a tandem configuration with a second strongly bonding $CO_2$ chemical filter or trap 14. The second strongly bonding filter 14 is positioned between the cathode inlet 32 and at least one of the thermally regenerative filter 12, 12A or 12B. The first filter 12, 12A or 12B is designed and constructed to provide a predetermined $CO_2$ absorption capacity, e.g., about 5% to 8% by weight, and a required or desired throughput capacity, e.g., corresponding to air residence times in the filter 12, 12A or 12B of at most about one second, to reduce the $CO_2$ level in the air stream exiting the filter 12, 12A or 12B by a predetermined amount, e.g., reduction by a factor of 10. In one configuration of the filter 12, 12A or 12B according to the invention, active material of the filter 12, 12A or 12B includes one or more polymers with amine functional groups. The strongly bonding filter 14 is designed and constructed to further reduce the $CO_2$ levels in the air stream it receives from the first filter 12, 12A or 12B before the air stream is supplied to the cathode inlet by a predetermined amount, e.g., reduction by a factor of 10. In one configuration of the assembly 50 according to the invention, active material of the second filter 14 includes lime soda, lithium hydroxide, potassium hydroxide or sodium hydroxide.

At stage 104, filtering an air stream supplied to the fuel cell by the air inlet 30 through the first filter 12, 12A or 12B to help to reduce the $CO_2$ level in the air stream exiting the first filter 12, 12A or 12B by the predetermined amount, e.g., from about 400 ppm to about 40 ppm, with a predetermined throughput and residence times of air in the first filter 12, 12A or 12B e.g., at most or about one second.

At stage 106, filtering the air stream exiting the first filter 12, 12A or 12B through the second filter 14 to help to reduce the $CO_2$ level in the air stream exiting the second filter 14 and entering the cathode inlet by the predetermined amount, e.g., from about 40 ppm to near 1 ppm.

At stage 108, purging the fuel cell electrochemically for $CO_2$ removal at the fuel cell anode through anodic decomposition by applying a maximum current to the fuel cell suitable to help to force participation of accumulating carbonate ions in the fuel cell anode as a reactant in the anode process (shown by equation (6)), thereby freeing $CO_2$ for removal from the fuel cell through the anode exhaust stream. The magnitude of the current is sufficiently high and just short of any magnitude that would cause an onset of fuel cell reversal in the stack. Such purging may be applied to the fuel cell temporarily and periodically.

At stage 110, maintaining the application of the purging current for a predetermined duration, e.g., of about 1 second to about 30 seconds, such that, a substantial portion of carbonate ions replaces a substantial portion of $OH^-$ ions as a reactant in the anode process and are thereby consumed electrochemically with $CO_2$ being released as a by-product and released from the fuel cell through the anode exhaust stream.

At stage 112, providing optionally during electrochemical purging stages, when required, supplemental power to accommodate the consequent temporary load modifications and reduced power output levels of the operating fuel cell stack. Such supplemental power may be provided by an auxiliary power source, e.g., an ultra-capacitor, or a battery.

Figure 3:
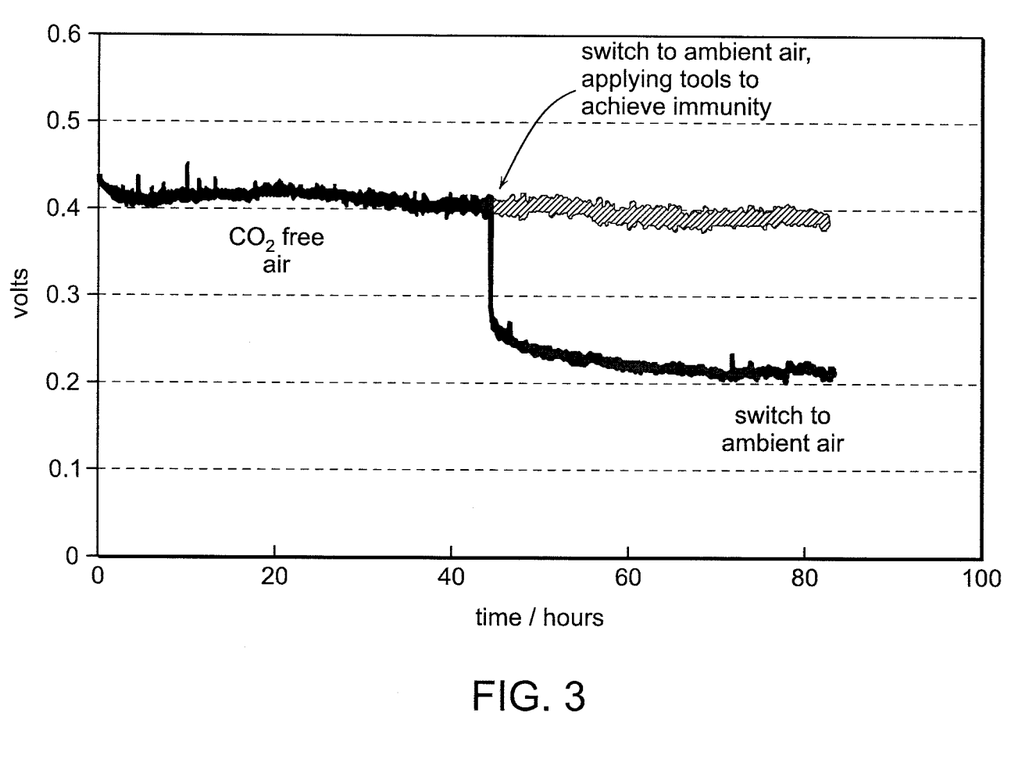
FIG. 3 is a chart that illustrates a decrease in alkaline fuel cell voltage, at constant current to the load, when a cathode air supply provided at "ultra zero" levels of any components other than oxygen and nitrogen is replaced with ambient air.

Referring to FIG. 3, a chart 52 illustrates a decrease in voltage of an alkaline fuel cell operating at a constant current to the load where an air supply to the cell cathode provided with "ultra zero" levels of any components other than oxygen and nitrogen, or is relatively $CO_2$ free, is switched to an ambient air supply. The chart also illustrates maintenance of voltage of the fuel cell using an ambient air supply to the cell cathode and the two-filter assembly 50 described above, or the filtration system 100 described below, to reduce the level of air $CO_2$. Filtration or active capture of $CO_2$ with the assembly 50 or the system 100 may be used in conjunction with the electrochemical perturbation method 200 described above for $CO_2$ removal and release at the fuel cell anode through anodic decomposition.

Figure 4:
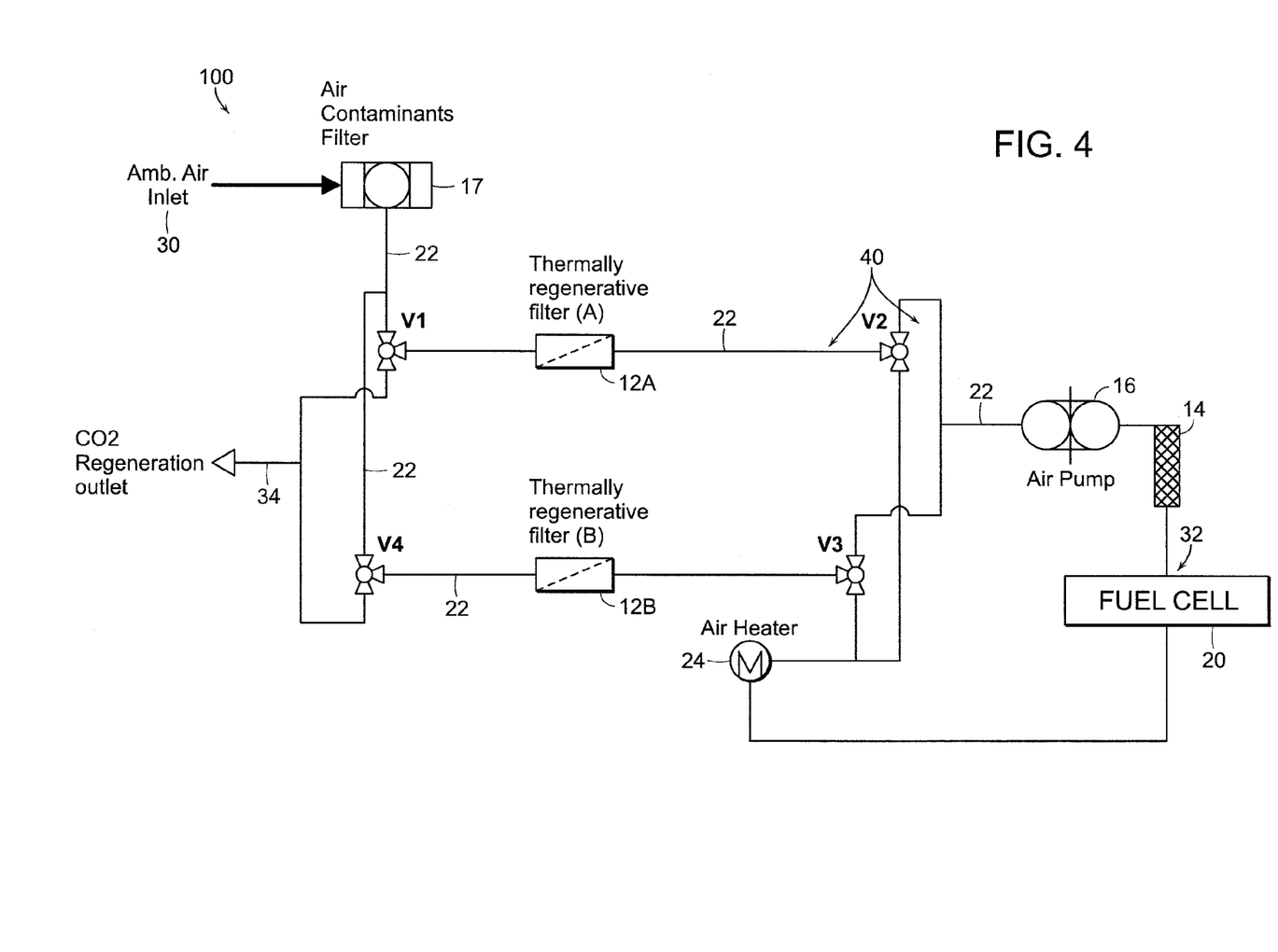
FIG. 4 is a schematic diagram of a $CO_2$ filtration system for an alkaline fuel cell comprising two thermally regenerative $CO_2$ filters or traps arranged for thermal rejuvenation according to another aspect of the invention.

Referring to FIG. 4, in another aspect, the invention provides a $CO_2$ filtration system 100 for an alkaline fuel cell 20 including a first thermally regenerative filter or trap 12A and a second thermally regenerative filter or trap 12B, each filter or trap 12A and 12B having the same properties and specifications as the thermally regenerative filter or trap 12 described above with reference to FIG. 1. The first and second thermally regenerative filters 12A and 12B are positioned downstream from an air inlet 30 and upstream from an inlet 32 of the fuel cell cathode. The first and the second thermally regenerative filters 12A and 12B are disposed in a parallel orientation to one another. In addition, each filter 12A and 12B is positioned upstream from and in a tandem configuration with the strongly bonding $CO_2$ filter or trap 14, which has the same properties and specifications as described above with reference to FIG. 1. The strongly bonding filter 14 is positioned upstream from the cathode inlet 32 and receives the filtered exit air stream from either the first filter 12A or the second filter 12A, depending the mode of operation of each filter 12A and 12B, as described below. The air pump 16 is disposed between the thermally regenerative filters 12A and 12B and the strongly bonding filter 14 to induce flow of an air stream through the filters 12A, 12B and 14 and into the cathode inlet. The system 100 is constructed and arranged to provide a thermal rejuvenation scheme that allows one of the filters 12A or 12B to actively filter $CO_2$ while the other filter 12A or 12B undergoes thermal rejuvenation, if needed.

The first and second thermally regenerative filters or traps 12A and 12B are configured and designed to enable thermal rejuvenation, e.g., via a thermal swing absorption (TSA) technique, by passing a warm or hot air stream through the filter 12A and 12B to release absorbed $CO_2$. The thermally regenerative filters 12A and 12B are operatively connected to and arranged with a subsystem of air flow lines 22 and valves $V_1, V_2, V_3$, and $V_4$, e.g., two-way and/or three-way valves, as shown in FIG. 4. The subsystem is configured and arranged to deliver from the air inlet 30 an inlet air stream to each filter 12A and 12B, and to selectively deliver the inlet air stream to either filter 12A or 12B depending on whether filter 12A or 12B is actively trapping $CO_2$ from the air stream. In addition, the subsystem is also configured and arranged to deliver a rejuvenation air stream for thermal regeneration to each filter 12A and 12B, and to selectively deliver the rejuvenation air stream to either filter 12A or 12B depending on whether filter 12A or 12B is designated for and/or undergoing thermal rejuvenation. The subsystem delivers the appropriate air stream depending on the mode of operation of the filters 12A and 12B, delivering the inlet air stream to filter 12A or 12B when active for filtering the inlet air stream to reduce the level of $CO_2$ and delivering the rejuvenation stream to filter 12A or 12B when undergoing thermal rejuvenation.

For instance, the subsystem can employ one or more of the air flow lines 22 and one or more of the valves $V_1, V_2, V_3$, and $V_4$ to deliver the inlet air stream to filter 12A that is actively trapping $CO_2$, and can deliver, e.g., simultaneously, the rejuvenation air stream to filter 12B that is undergoing thermal regeneration, or vice versa. The first and second filters 12A and 12B and certain of the air flow lines 22 and valves $V_1, V_2, V_3$, and $V_4$ can thereby help to enable one of the filters 12A or 12B to reduce the level of $CO_2$ in the inlet air stream, while enabling the other filter 12A or 12B to undergo thermal rejuvenation by passing a warm or hot air rejuvenation stream through the filter 12A or 12B. The system 100 according to the invention may operate to ensure that at least one of the thermally regenerative filters 12A or 12B is always actively trapping $CO_2$ to reduce the level of $CO_2$ in the air stream that will subsequently be supplied to the strongly bonding filter or trap 14.

In one configuration of the subsystem according to the invention, certain airflow lines 22 and valves $V_1, V_2, V_3$, and $V_4$ are configured and arranged to redirect the warm or hot cathode exhaust air stream to the first and second filters 12A and 12B, such that, the cathode exhaust stream serves as the rejuvenation stream as it passes through filter 12A or 12B, depending on whether filter 12A or filter 12B is designated for and/or undergoing thermal regeneration. The system 100 according to the invention thereby implements in-line thermal rejuvenation of the first and second filters 12A and 12B without requiring disassembly of the filters 12A and 12B. Such in-line rejuvenation can be performed during operation of the fuel cell 20, such that, at least one of the first and second filters 12A and 12B, either filter 12A or 12B, is dedicated to receiving and filtering the inlet air stream.

In one configuration of the system 100 according to the invention, the redirected cathode exhaust stream serving as the rejuvenation air stream may include additional or supplemental heating provided by an in-line heater 24, e.g., an electric or catalytic heater, operatively connected with one or more of the air flow lines 22 and/or one or more of the valves $V_1, V_2, V_3$, and $V_4$ of the subsystem, to help to increase temperatures of the rejuvenation air stream to the required or desired rejuvenation temperatures. Such an in-line heater 24 may use some hydrogen fuel of the fuel cell 20 for its operation.

Thermal release of $CO_2$ is achieved by passing the rejuvenation air stream through filter 12A or 12B at temperatures within a range of from about 80 degrees C. to about 120 degrees C., and preferably from about 100 degrees C. to about 105 degrees C. In addition, the configuration and operation temperatures of the filters 12A and 12B ensure that the time required for the filter 12A and 12B to recover $CO_2$ absorbing capacity is less than the $CO_2$ saturation time under equal airflow rates during the adsorption and desorption half cycles. Subsequent to passing through the filter 12A or 12B undergoing thermal regeneration, the rejuvenation air stream may be released from the subsystem via the $CO_2$ regeneration air stream outlet 34

One of more of the air flow lines 22 and one or more of the valves $V_1, V_2, V_3$, and $V_4$, are also configured and arranged to deliver to the strongly bonding filter 14 the exit air stream from either the first or second filter 12A or 12B for further $CO_2$ absorption by the filter 14 as the air stream passes through the filter 14. One or more of the air flow lines 22 and one or more of the valves $V_1, V_2, V_3$, and $V_4$ are configured and arranged to deliver the exit air stream from the filter 14 to the cathode inlet 32. At least one air flow line 22 receives an inlet air stream from the air inlet 30 to direct flow of the air stream to the first or second filter 12A or 12B, depending on which filter 12A or 12B is engaging in filtering the air stream. An air contaminants filter 17 may be operatively coupled to this air flow line 22 to help to remove any contaminants present in the inlet air stream.

As described, the system 100 and, in particular, the sub-system of air flow lines 22 and valves $V_1$, $V_2$, $V_3$, and $V_4$, enables operation of the pair of thermally regenerative filters 12A and 12B in different modes whereby one mode includes filter 12A or 12B actively trapping $CO_2$ and a second mode includes filter 12A or 12B undergoing thermal regeneration, e.g., via redirection of the exhaust cathode stream through such filter 12A and 12B. For instance, filter 12B may undergo thermal rejuvenation while, at the same time, filter 12A is actively trapping $CO_2$ in the air stream. Switching the modes of operation of each filter 12A and 12B from actively trapping $CO_2$ to thermal rejuvenation and then back to actively trapping $CO_2$ may be accomplished after a preset period of time of operation of the fuel cell 20 at some given fuel cell power output. After expiration of the preset period of time of operation, the air streams within the fuel cell 20 may be redirected by one or more of the valves $V_1$, $V_2$, $V_3$, and $V_4$ and one or more of the air flow lines 22, such that, the exhaust cathode stream may be re-directed to filter 12A or 12B for thermal rejuvenation and the inlet air stream may be directed to filter 12A or 12B for active trapping of $CO_2$ in the air stream.

The inventions disclosed above with reference to FIGS. 1 and 2 and FIG. 4 provide flexibility in addressing any particular application for reduction of the $CO_2$ level in the air stream provided to the cathode inlet 32 and for ultimately achieving $CO_2$ immunity in an alkaline fuel cell 20. In particular, the two-filter assembly 50 or the system 100 may be used alone or in conjunction with the method 200 of electrochemical perturbation to reduce the $CO_2$ level. In addition, reduction of the $CO_2$ level in the air stream may also be accomplished using only one type of the two types of filters 12 and 14 of the two-filter assembly 50, with or without use of the electrochemical perturbation method 200. Similarly, reduction of the $CO_2$ level in the air stream may also be accomplished using only one of the pair of thermally regenerative filters 12A and 12B of the system 100, with or without use of the electrochemical perturbation method 200. The options would depend upon the particular application, the specifications of the $CO_2$ filters, and the efficiency of the electrochemical perturbation method 200 in an alkaline fuel cell; and, would depend on a given membrane and electrode materials and their specifications. Some of such options are summarized below:

(1) Using one of the pair of thermally-regenerative filters 12A or 12B of the system 100 for active $CO_2$ absorption while the other filter 12A or 12B is undergoing thermal rejuvenation in order to maintain $CO_2$ absorption and thereby reduction of the $CO_2$ level in the air stream at all times during operation of the alkaline fuel cell.

(2) Using only one of the thermally regenerative filters 12, 12A or 12B, where the air stream passes only through the strongly bonding $CO_2$ filter 14, while the thermally regenerative filter 12, 12A or 12B undergoes thermal rejuvenation.

(3) Using only the strongly bonding $CO_2$ filter 14 upstream from the cathode inlet 32 in conjunction with the method 200 of electrochemical perturbation, when required. This option is desirable where the frequency of manual replacement of the filters 14 is dictated by suitable dimensions of the filter 14 and is operationally acceptable.

(4) Any option involving thermal regeneration of one of the filters 12, 12A or 12B where at least some of the thermal energy used for the thermal rejuvenation is derived from the re-direction of the cathode exhaust stream through the filter 12, 12A or 12B.

One of ordinary skill in the art can appreciate that the inventions disclosed are not limited to the options described above and the inventions envision other possible combinations of these $CO_2$ absorption and release capabilities that the two-filter assembly 50 or the $CO_2$ filtration system 100 can provide to a given alkaline fuel cell and its stack subsystems, depending on the given operating conditions and specifications of the filters or traps 12, 12A, 12B and 14 and given the fuel cell, to help to achieve $CO_2$ immunity within the fuel cell.

Figure 5:
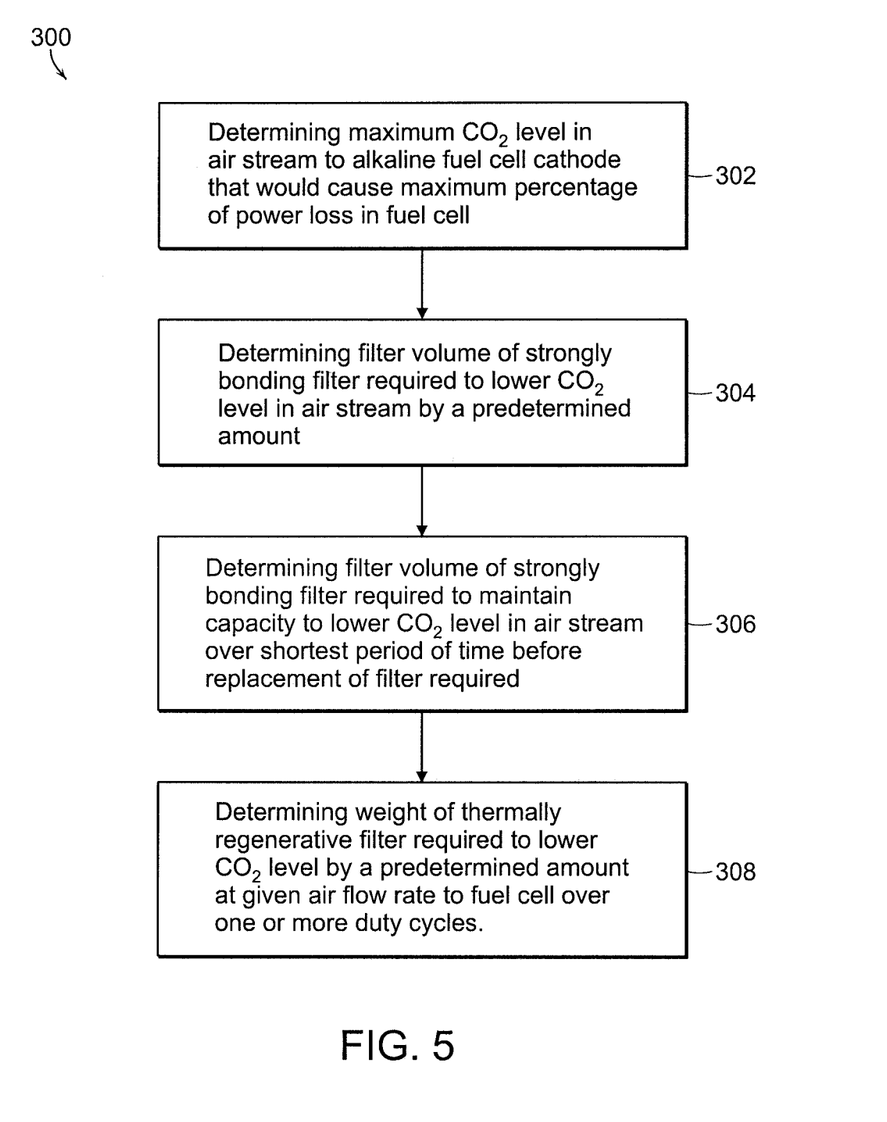
FIG. 5 is a flow diagram illustrating a method of determining minimum overall dimensions of a design of the $CO_2$ filtration assembly or system according to the invention to ensure reduction of $CO_2$ level in an air stream to cathode inlet.

Referring to FIG. 5, in another aspect, the invention provides a method 300 of determining the minimum overall dimensions of a design of the $CO_2$ filtration assembly 50 or the system 100 according to the invention to help to ensure the reduction of $CO_2$ levels in an air stream to the cathode inlet 32 to ultra-low $CO_2$ levels. The method 300 is exemplary only and may be modified, e.g., by adding, removing, and/or rearranging stages.

At stage 302, determining a maximum $CO_2$ level in an air stream to the cathode inlet 32 of the alkaline fuel cell 20 that would cause a loss of fuel cell power at a maximum predetermined percentage.

At stage 304, determining a volume of the strongly bonding filter or trap 14 that is required for the filter or trap 14 to lower $CO_2$ levels in the air stream exiting the thermally regenerative filter or trap 12, 12A and 12B.

At stage 306, determining a volume of the strongly bonding filter or trap 14 that is required to contain and/or to maintain the filter's 14 active material to trap $CO_2$, e.g., at about 30 to 40 ppm, over the shortest period of time acceptable for replacement of the filter 14.

At stage 306, determining the weight of the thermally-rejuvenated active material of each thermally regenerative filter or trap 12, 12A and 12B required to lower $CO_2$ levels in the air stream to the cathode inlet, e.g., from about 400 ppm to about 30 to 40 ppm or by a factor of 10, at a given air flow rate to the fuel cell over duration of a typical "On" period of a given duty cycle, e.g., 8 hours, and preferably to help to accomplish thermal rejuvenation during the fuel cell "Off" period.

Having thus described at least one illustrative aspect of the invention, various alterations, modifications and improvements will readily occur to those skilled in the art. Such alterations, modifications and improvements are intended to be within the scope and spirit of the inventions disclosed above. Accordingly, the foregoing description is by way of example only and is not intended as limiting. The invention's limit is defined only in the following claims and the equivalents thereto.

What is claimed is:

1. An alkaline fuel cell comprising: an air inlet operatively coupled with a multi-trap air filter assembly; the multi-trap air filter assembly including a series of a first thermally regenerative chemical $CO_2$ trap arranged in tandem with a second strongly-bonding $CO_2$ chemical trap, the first and second $CO_2$ traps being disposed downstream from the air inlet, the second $CO_2$ trap disposed between the first $CO_2$ trap and an inlet to the cathode of the alkaline fuel cell; the first and second $CO_2$ traps reduce levels of $CO_2$ in an air stream supplied to the inlet to the cathode; and wherein the alkaline fuel cell includes an alkaline aqueous electrolyte or an OH⁻ ion conducting polymeric membrane without liquid electrolyte, wherein the first CO₂ trap includes, as active material, a resin with amine functional groups serving as CO₂ trapping sites via a reaction of the amine with CO₂ and water vapor forming bicarbonate according to a process:

$$R\text{—}NH_2 + CO_2 + H_2O = R\text{—}NH_3^+(HCO_3^-) \text{ or;}$$

CO₂ trapping sites via a reaction with CO₂ under dry air conditions forming carbamate according to a process:

$$2(R\text{—}NH_2) + CO_2 = (R\text{—}NHCOO\text{—})(R\text{—}NH_3+)$$

where R includes a carbonaceous polymer backbone,
wherein the first CO₂ trap is for thermal regeneration whereby the first CO₂ trap releases absorbed CO₂ in response to rejuvenation air passing through the first CO₂ trap at temperatures within a range of between about 80 degrees C. and 120 degrees C., and preferably within a range of between about 100 degrees C. to about 105 degrees C.

2. The alkaline fuel cell of claim 1, wherein, per kW of power generated, the first CO₂ trap defines dimensions of about 2 liters and is configured to reduce the level of CO₂ in the air stream by a factor of about 10.

3. The alkaline fuel cell of claim 1, wherein the first CO₂ trap is configured to enable residence time of gas within the first CO₂ trap of up to about 1 second, and is further configured to reduce levels of CO₂ in the air stream by a factor of about 10.

4. The alkaline fuel cell of claim 1, wherein the first CO₂ trap is configured to reduce levels of CO₂ in the air stream on passing the air stream through the first CO₂ trap by a factor of about 10 and wherein the air stream passing through the first CO₂ trap has temperatures of up to about 45 degrees C.

5. The alkaline fuel cell of claim 1, wherein the configuration and operation temperatures for the first CO₂ trap ensure that the time for thermal regeneration to recover CO₂ trapping capacity is shorter than the CO₂ saturation time under substantially equal air flow rates during adsorption and desorption half cycles.

6. The alkaline fuel cell of claim 1, wherein the first CO₂ trap is configured for thermal regeneration by passing a rejuvenating air stream through the first CO₂ trap, wherein the rejuvenating air stream includes the cathode exhaust air supplied to the first CO₂ trap with or without additional heating.

7. The alkaline fuel cell of claim 6, wherein the additional heating includes heating provided by an electric heater or a catalytic heater operatively coupled with the fuel cell.

8. The alkaline fuel cell of claim 1, wherein the second CO₂ trap includes an active material including soda lime, lithium hydroxide, or sodium hydroxide.

9. The alkaline fuel cell of claim 1, wherein the second CO₂ trap is configured to reduce levels of CO₂ in the air stream exiting from the first CO₂ trap by a factor of about 10.

10. The alkaline fuel cell of claim 1, wherein the first CO₂ trap is configured to reduce levels of CO₂ in the air stream by a factor of about 10, and the second CO₂ trap is configured to reduce levels of CO₂ in the air stream exiting from the first CO₂ trap by a factor of about 10, wherein the level of CO₂ in the air stream supplied to the cathode air inlet is under about 5 ppm, and preferably equal to or less than about 1 ppm.

11. The alkaline fuel cell of claim 1, wherein the second CO₂ trap is disposable and configured for periodic replacement.

12. The alkaline fuel cell of claim 1, further comprising the application of a perturbation current to remove residual carbonate buildup in the membrane of the alkaline membrane fuel cell electrolyte through anodic electrochemical consumption of carbonates and release of CO₂ through the anode exhaust stream of the fuel cell, the perturbation current having a magnitude being just short of an onset of cell reversal in the stack.

13. The alkaline fuel cell of claim 12, wherein duration of the application of the perturbation current is from about 1 second to about 30 seconds.

14. The alkaline fuel cell of claim 13, wherein the perturbation current is triggered in response to a decrease in fuel cell performance over a given operation time.

15. The alkaline fuel cell of claim 12, further comprising an auxiliary power supply operatively coupled with the fuel cell and configured to supplement or supply power to the load and without interruption during the application of the perturbation current.

16. The alkaline fuel cell of claim 15, wherein the auxiliary power includes a battery operatively coupled with the fuel cell for recharging from the fuel cell after completion of the application of the perturbation current.

* * * * *